US008810887B2

(12) United States Patent
Jeon et al.

(10) Patent No.: US 8,810,887 B2
(45) Date of Patent: Aug. 19, 2014

(54) INK FOR ELECTROCHROMIC DEVICE AND ELECTROCHROMIC DEVICE AND METHOD OF MANUFACTURING THE SAME

(75) Inventors: Seog Jin Jeon, Yongin-si (KR);
Rupasree Ragini Das, Suwon-si (KR);
Seon-Jeong Lim, Yongin-si (KR);
Chang Ho Noh, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 243 days.

(21) Appl. No.: 13/067,378

(22) Filed: May 27, 2011

(65) Prior Publication Data

US 2012/0154890 A1  Jun. 21, 2012

(30) Foreign Application Priority Data

Dec. 16, 2010 (KR) .................. 10-2010-0129286

(51) Int. Cl.
*G02F 1/15* (2006.01)
(52) U.S. Cl.
CPC ...................................... *G02F 1/15* (2013.01)
USPC .......................................................... 359/265
(58) Field of Classification Search
USPC .................. 359/265, 266, 269, 273, 274
See application file for complete search history.

(56) References Cited

U.S. PATENT DOCUMENTS

| 4,993,810 | A | 2/1991 | Demiryont |
| 6,067,184 | A | 5/2000 | Bonhote et al. |
| 6,879,424 | B2 * | 4/2005 | Vincent et al. ............... 359/265 |
| 7,785,496 | B1 | 8/2010 | Shim et al. |
| 8,059,330 | B2 | 11/2011 | Takagi et al. |
| 2009/0097096 | A1 | 4/2009 | Noh et al. |
| 2010/0132988 | A1 | 6/2010 | Valentin et al. |

FOREIGN PATENT DOCUMENTS

| CN | 1949070 A | 4/2007 |
| JP | 2000506629 T | 5/2000 |
| JP | 2009186731 A | 8/2009 |
| JP | 2009198974 A | 9/2009 |
| JP | 2009288409 A | 12/2009 |
| KR | 20060020110 A | 3/2006 |
| KR | 20090037063 A | 4/2009 |
| KR | 20090075850 A | 7/2009 |
| WO | WO-9735227 A2 | 9/1997 |
| WO | WO 02/075441 A2 | 9/2002 |
| WO | WO-2008053109 A2 | 5/2008 |

OTHER PUBLICATIONS

Notice of Allowance dated Sep. 24, 2012 issued in related U.S. Appl. No. 13/064,578.
European Search Report dated May 3, 2012 in corresponding European Application No. 11187575.

(Continued)

*Primary Examiner* — Joseph P Martinez
(74) *Attorney, Agent, or Firm* — Harness, Dickey & Pierce, P.L.C.

(57) ABSTRACT

Disclosed is ink for an electrochromic device including an electrochromic material, a metal salt, and a solvent. Disclosed also is an electrochromic device that includes a first electrode and a second electrode facing each other, an auxiliary electrode disposed on the first electrode or the second electrode, an electrochromic layer applied on the auxiliary electrode, and an electrolyte interposed between the first electrode and second electrode, wherein the electrochromic layer is formed using ink including an electrochromic material and a metal salt. Disclosed also is a method of manufacturing the electrochromic device.

15 Claims, 10 Drawing Sheets

(56) References Cited

OTHER PUBLICATIONS

Stuart L. James, "Metal-organic frameworks", *Chem. Soc. Rev.*, vol. 32, pp. 276-288 (2003).

Shen, Qingyue et al. "Color-Changing Mechanism of Electrochromic Materials and Their Research Progress," 2007. (with English Abstract).

Chinese Office Action dated Mar. 5, 2014 issued in corresponding Chinese Application No. 201110384979.3 (with English translation).

* cited by examiner

INK FOR ELECTROCHROMIC DEVICE AND ELECTROCHROMIC DEVICE AND METHOD OF MANUFACTURING THE SAME

CROSS-REFERENCE TO RELATED APPLICATION

This application claims priority under 35 U.S.C. §119 to Korean Patent Application No. 10-2010-0129286 filed in the Korean Intellectual Property Office (KIPO) on Dec. 16, 2010, the entire contents of which are incorporated herein by reference.

BACKGROUND

1. Field

Example embodiments provide ink for an electrochromic device, an electrochromic device, and a method of manufacturing the same are provided.

2. Description of the Related Art

Electrochromism refers to a phenomenon in which a color reversibly changes by the direction of an electric field when a voltage is applied. A material having such property, that is, a material whose optical characteristic may reversibly change through an electrochemical redox reaction, is called an electrochromic material. An electrochromic material may not show color until an electric field is applied thereto, and it is reduced due to electron acceptance to show color when an electric field is applied. Conversely, it may show color when no electric field is applied, and when an electric field is applied it loses the color due to oxidation from electron donation.

Such an electrochromic material may be formed using various methods. For example, an electrochromic material may be adsorbed on a particle of titanium oxide ($TiO_2$) and formed by screen printing. In this case, however, there is a limit in raising resolution, and production cost may be increased since the method additionally requires the use of a mask.

Alternatively, the electrochromic material may be formed by an inkjet printing method. The inkjet printing method is a technology of spraying inks to a predetermined position by using an inkjet head and realizing an image colored by the inks. Since this method may show a plurality of colors at once, the production process and time may be shortened, and since the inks are applied to a target position, the consumption of the electrochromic material may be reduced.

SUMMARY

Example embodiments provide ink for an electrochromic device capable improving color characteristics when forming an electrochromic layer using an inkjet printing method. Example embodiments also provide an electrochromic device formed using the ink. Example embodiments also provide a method of manufacturing the electrochromic device.

In accordance with example embodiments, an ink for an electrochromic device may include an electrochromic material, a metal salt, and a solvent.

In accordance with example embodiments, an electrochromic device may include a first electrode and a second electrode facing each other, an auxiliary electrode on one of the first electrode and the second electrode, an electrochromic layer on the auxiliary electrode, and an electrolyte between the first electrode and second electrode. In example embodiments, the electrochromic layer may include ink having an electrochromic material and a metal salt.

In accordance with example embodiments, a method for manufacturing an electrochromic device may include preparing a first electrode, forming an auxiliary electrode on the first electrode, forming an electrochromic layer on the auxiliary electrode by using ink including an electrochromic material, a metal salt, and a solvent, arranging a second electrode on the first electrode, and filling spaces between the first electrode and the second electrode with an electrolyte.

In accordance with example embodiments, an electrochromic device may include an electrochromic layer on an auxiliary electrode, the electrochromic layer including an electrochromic material and a metal salt.

In accordance with example embodiments, ink for an electrochromic device may include an electrochromic material, a metal salt, and a solvent.

The metal salt may include a metal that forms a complex compound with an electrochromic material through heat treatment.

The metal may include zinc (Zn), indium (In), magnesium (Mg), zirconium (Zr), strontium (Sr), tin (Sn), hafnium (Hf), tantalum (Ta), cerium (Ce), lanthanum (La), vanadium (V), niobium (Ni), yttrium (Y), or a combination thereof.

The ink may display a color of a different color coordinate from an intrinsic color of the electrochromic material.

The electrochromic material may be included in an amount of about 0.01 wt % to about 30 wt % based on the total weight of the ink.

The metal salt may be included in an amount of about 100 to about 2000 parts by weight based on 100 parts by weight of the electrochromic material.

The ink for an electrochromic device may further include at least one of a dissolution aid agent and a viscosity controlling agent.

In accordance with example embodiments, an electrochromic device may include a first electrode and a second electrode facing each other, an auxiliary electrode disposed on the first electrode or the second electrode, an electrochromic layer applied on the auxiliary electrode, and an electrolyte positioned between the first electrode and second electrode, wherein the electrochromic layer is formed using ink including an electrochromic material and a metal salt.

The electrochromic layer may include a complex compound of a metal of the metal salt and the electrochromic material.

The metal may include zinc (Zn), indium (In), magnesium (Mg), zirconium (Zr), strontium (Sr), tin (Sn), hafnium (Hf), tantalum (Ta), cerium (Ce), lanthanum (La), vanadium (V), niobium (Ni), yttrium (Y), or a combination thereof.

The electrochromic layer formed using the ink may display a color having a different color coordinate from an intrinsic color of the electrochromic material.

In accordance with example embodiments, a method for manufacturing an electrochromic device is provided that includes preparing a first electrode, forming an auxiliary electrode on the first electrode, forming an electrochromic layer on the auxiliary electrode by using ink including an electrochromic material, a metal salt, and a solvent, disposing a second electrode to face the first electrode, and filling the space between the first electrode and the second electrode with an electrolyte.

The forming the electrochromic layer may include spraying the ink onto the auxiliary electrode, and heat-treating the ink.

The heat-treating the ink may be performed at a temperature of about 60 to 300° C.

The metal salt may include a metal that forms a complex compound with the electrochromic material through the heat treatment.

The metal may include zinc (Zn), indium (In), magnesium (Mg), zirconium (Zr), strontium (Sr), tin (Sn), hafnium (Hf), tantalum (Ta), cerium (Ce), lanthanum (La), vanadium (V), niobium (Ni), yttrium (Y), or a combination thereof.

The manufacturing method may further include firing the auxiliary electrode at a temperature of about 300 to 500° C.

BRIEF DESCRIPTION OF THE DRAWINGS

The patent or application file contains at least one drawing executed in color. Copies of this patent or patent application publication with color drawings will be provided by the Office upon request and payment of the necessary fee. The above and other features and advantages will become more apparent by describing in detail example embodiments thereof with reference to the attached drawings.

DETAILED DESCRIPTION

Figure 1:
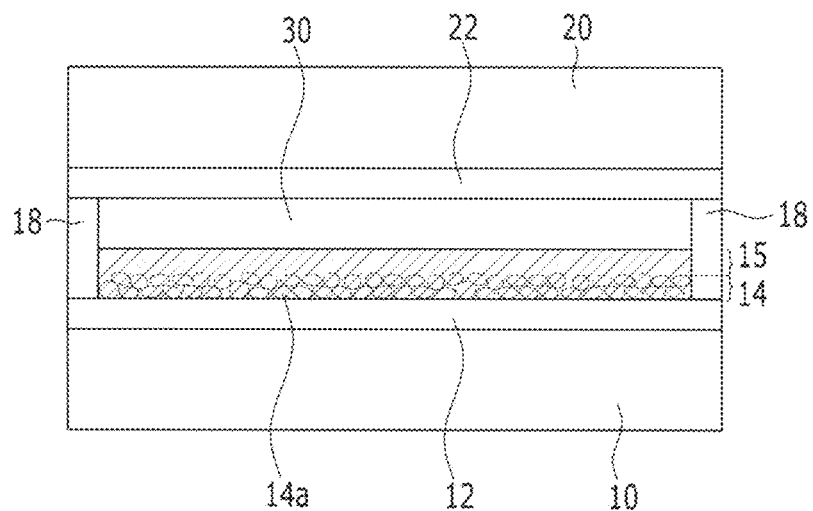
FIG. 1 is a cross-sectional view of an electrochromic device according to example embodiments.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will be described more fully hereinafter with reference to the accompanying drawings. This disclosure may, however, be embodied in many different forms and should not be construed as limited to example embodiments as set forth herein.

Hereinafter, an ink for an electrochromic device according to example embodiments is described.

The ink for an electrochromic device, according to example embodiments, may include an electrochromic material, a metal salt, and a solvent.

The electrochromic material may be a compound capable of reversible color display by electrochemical change according to an electric field direction when a voltage is applied, and it may display a unique color according to the material.

The electrochromic material may be a cathodic coloration material that displays a color in a reduction state and becomes transparent in an oxidation state, or the electrochromic material may be an anodic coloration material that displays a color in an oxidation state and becomes transparent in a reduction state.

The electrochromic material may include: a viologen compound; a phthalate-based compound (for example, an isophthalate); a pyridine-based compound; an anthraquinone-based compound; an aminoquinone-based compound; a rare earth element-based organic compound; a phthalocyanine-based compound; a ruthenium-based organometallic compound; a leuco-based dye compound; a phenothiazine-based compound; and a polymer compound. Although a list of electrochromic materials is provided, example embodiments are not limited thereto as this list is merely exemplary.

The electrochromic material may be included in an amount of about 0.01 wt % to about 30 wt % based on the total weight of the ink for an electrochromic device.

The metal salt may include a metal capable of forming a complex compound with an electrochromic material through heat treatment.

The metal may include a light metal, a transition metal, a lanthanide metal, an alkali metal, and/or a combination thereof, for example zinc (Zn), indium (In), magnesium (Mg), zirconium (Zr), strontium (Sr), tin (Sn), hafnium (Hf), tantalum (Ta), cerium (Ce), lanthanum (La), vanadium (V), niobium (Ni), yttrium (Y), and/or a combination thereof. Although a list of metals is provided, example embodiments are not limited thereto as this list is merely exemplary.

The metal may be included in a form of a metal salt, for example an acetate, a carbonyl, a carbonate, a nitrate, a sulfate, a phosphate, and/or a chloride (halide).

As described above, the electrochromic material and metal may form a complex compound through heat treatment. In example embodiments, the electron transferring path of the electrochromic material may be changed by forming a complex compound of an electrochromic material and a metal, and accordingly the color coordinates of the color represented by the complex compound of the electrochromic material and the metal may be different from the color coordinates of the intrinsic color represented by the electrochromic material, and/or the color purity may be improved. For example, in the case of an electrochromic material representing a red color, the complex compound may represent a red color of different color coordinates from the color coordinates of the red color represented by the electrochromic material. Also, the color purity of a represented color may be improved.

The metal salt may be included in an amount of about 100 to about 2000 parts by weight based on 100 parts by weight of the electrochromic material. When the metal salt is included in an amount of the above range, the electrical characteristics of the electrochromic device caused by the metal salt may not be affected while a sufficient amount of complex compound is generated with the electrochromic material.

The solvent may be any solvent capable of dissolving the electrochromic material and the metal salt. Examples of the solvent include, for example, at least one selected from deionized water, methanol, ethanol, propanol, isopropanol, 2-methoxyethanol, 2-ethoxyethanol, 2-propoxyethanol 2-butoxyethanol, methylcellosolve, ethylcellosolve, diethylene glycol methylether, diethylene glycol ethylether, dipropylene glycol methylether, toluene, xylene, hexane, heptane, octane, ethyl acetate, butyl acetate, diethylene glycol dimethylether, diethylene glycol dimethylethylether, methylmethoxy propionate, ethylethoxy propionate, ethyl lactate, propylene glycol methylether acetate, propylene glycol methylether, propylene glycol propylether, methylcellosolve acetate, ethylcellosolve acetate, diethylene glycol methylacetate, diethylene glycol ethyl acetate, acetone, methyl isobutyl ketone, cyclohexanone, dimethyl formamide (DMF), N,N-dimethyl acetamide (DMAc), N-methyl-2-pyrrolidone, γ-butyrolactone, diethylether, ethylene glycol dimethylether, diglyme, tetrahydrofuran, acetylacetone, and acetonitrile. Although a list of solvents is provided, example embodiments are not limited thereto as this list is merely exemplary.

The solvent may be included in a balance amount excluding the electrochromic material and the metal salt.

The ink for an electrochromic device may further include at least one of a dissolution aid agent and a viscosity controlling agent besides the electrochromic material, metal salt, and solvent.

The dissolution aid agent may decrease the solubility deviation according to the characteristics of the electrochromic material and increase the solubility of the electrochromic material.

The dissolution aid agent may include an acid, for example, acetic acid. Such an acid may inhibit agglomeration of the functional groups at the terminal groups of the electrochromic material, e.g., carboxylic acid or phosphonic acid, being agglomerated through a hydrogen bond, and thus may increase solubility. Accordingly, the contrast ratio of the final device is prevented or inhibited from being deteriorated by an electrochromic material having low solubility and the storage stability may be improved as well.

The viscosity controlling agent may increase the spray characteristics during inkjet printing by maintaining the viscosity of the ink for an electrochromic device at an appropriate level. Non-limiting examples of the viscosity controlling agent include ethylene glycol.

Hereafter, an electrochromic device using the ink for an electrochromic device is described with reference to the accompanying drawings.

FIG. 1 is a cross-sectional view of an electrochromic device according to example embodiments.

Referring to FIG. 1, the electrochromic device according to example embodiments may include a pair of insulation substrates 10 and 20 facing each other, and a lower electrode 12 and an upper electrode 22 formed on the insulation substrates 10 and 20, respectively.

The insulation substrates 10 and 20 may be formed of transparent glass or plastic. Examples of the plastic include one or more selected from polyacrylate, polyethylene ether phthalate, polyethylene naphthalate, polycarbonate, polyarylate, polyetherimide, polyethersulfone, and polyimide.

The lower electrode 12 may be formed of a transparent conductive material, for example inorganic conductive materials including indium tin oxide (ITO) or fluorine-doped tin oxide (FTO), or organic conductive materials such as polyacetylene or polythiophene.

The upper electrode 22 may be formed of a transparent or opaque conductive material, for example indium tin oxide (ITO), fluorine-doped tin oxide (FTO), a metal such as aluminum (Al), antimony-doped tin oxide (ATO), and a combination thereof. Although a list of materials for forming a transparent or opaque conductive material is provided, example embodiments are not limited thereto as this list is merely exemplary.

In example embodiments, an auxiliary electrode 14 may be disposed on the lower electrode 12. The auxiliary electrode 14 may include a plurality of oxide semiconductor particles 14a formed of, for example, titanium oxide ($TiO_2$), zinc oxide (ZnO), zirconium oxide (ZrO), strontium oxide (SrO), niobium oxide (NbO), hafnium oxide (HfO), tin oxide (SnO), and/or a combination thereof. Although a list of oxide semiconductor particles is provided, example embodiments are not limited thereto as this list is merely exemplary.

The oxide semiconductor particles 14a may be of various shapes including those of a sphere, tetrahedron, cylinder, triangle, disk, tripod, tetrapod, cube, box, star, tube, and the like, and an average particle diameter thereof may be about 1 nm to about 200 nm.

In example embodiments, an electrochromic layer 15 may be formed on one side of the auxiliary electrode 14.

The electrochromic layer 15 may be formed using an ink including the above-described electrochromic material and a metal salt. As described above, the metal included in the metal salt and the electrochromic material may form a complex compound.

It is illustrated in the drawings that the electrochromic layer 15 is formed over the auxiliary electrode 14, but in reality, a liquid-phase ink may be sprayed onto the auxiliary electrode 14 which may be applied to spaces between the oxide semiconductor particles 14a of the auxiliary electrode 14 and thereby cover the surfaces of the oxide semiconductor particles 14a.

In example embodiments, the ink may include a metal salt to improve the electron mobility of the auxiliary electrode 14 as the ink permeates into the spaces between the oxide semiconductor particles 14a of the auxiliary electrode 14, and at the same time, the complex compound of an electrochromic material and a metal may be formed to represent a color with improved color coordinates, comparing the color represented by the electrochromic material. As a result, the color characteristics may be improved.

The insulation substrates 10 and 20 may be fixed by a spacer 18, and the space between the insulation substrates 10 and 20 may be filled with an electrolyte 30. The electrolyte 30 may provide an oxidation/reduction material reacting with an electrochromic material, and may be a liquid electrolyte or a solid polymer electrolyte. The liquid electrolyte may include, for example, a solution wherein a lithium salt, for example, LiOH or $LiCIO_4$, a potassium salt, for example, KOH, or a sodium salt, for example, NaOH, is dissolved in a solvent, but example embodiments are not limited thereto. The solid electrolyte may include, for example, poly(2-acrylamino-2-methylpropane sulfonic acid) or poly(ethylene oxide), however, example embodiments not limited thereto.

Hereafter, a method for fabricating the electrochromic device is described with reference to FIGS. 1 and 2.

Figure 2:
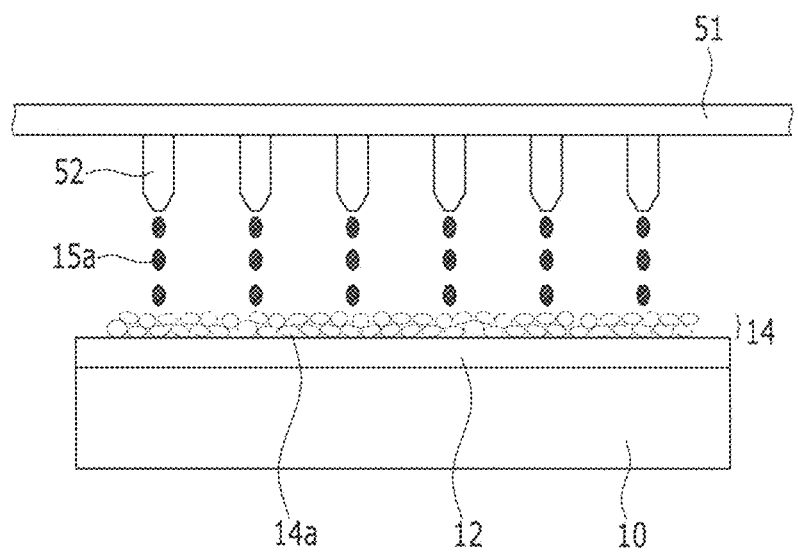
FIG. 2 illustrates a process of forming an electrochromic layer through an inkjet printing method when the electrochromic device of FIG. 1 is fabricated.

FIG. 2 illustrates a process of forming an electrochromic layer through an inkjet printing method when the electrochromic device of FIG. 1 is fabricated.

In example embodiments, a lower electrode 12 is formed on an insulation substrate 10.

In example embodiments, an auxiliary electrode 14 may be formed on the lower electrode 12. The auxiliary electrode 14 may be coated with a solution prepared by mixing oxide semiconductor particles 14a, for example, titanium oxide, with a solvent. In example embodiments, the auxiliary electrode 14 may be formed on the lower electrode 12 after the lower electrode 12 is formed on the insulation substrate 10.

In example embodiments, the auxiliary electrode 14 may be fired. The firing temperature may range from about 300° C. to about 500° C. The firing procedure may increase the close contacting property of the oxide semiconductor particles 14a.

In example embodiments, an electrochromic layer 15 may be formed on the auxiliary electrode 14 through an inkjet printing process.

Referring to FIG. 2, an inkjet printing system may be disposed over the auxiliary electrode 14 to form the electrochromic layer. The inkjet printing system may include an inkjet printing body (not shown), an inkjet printing head 51, and a plurality of nozzles 52, and ink 15a may be sprayed from the nozzles 52.

As described above, the ink 15a may include an electrochromic material, a metal salt, and a solvent, and it may further include an additive, for example, a dissolution aid agent or a viscosity controlling agent.

The ink 15a may be sprayed onto the auxiliary electrode 14 to be applied to spaces between the oxide semiconductor particles 14a and/or on the surfaces of the oxide semiconductor particles 14a.

In example embodiments, the ink 15a may undergo a heat treatment. Through the heat treatment, the solvent included in the ink 15a may be removed while the complex compound of the electrochromic material and the metal salt is formed. The heat treatment may be performed at a temperature ranging from about 60° C. to about 300° C. For example, a primary heat treatment may be performed at a temperature higher than the boiling point of the solvent, which ranges from about 60° C. to about 150° C., and then a secondary heat treatment may be performed at a temperature ranging from about 100° C. to about 300° C.

In example embodiments another insulation substrate 20 may be prepared and an upper electrode 22 may be formed thereon. In example embodiments, a reflective layer (not shown) may be formed on one side of the upper electrode 22.

The insulation substrates 10 and 20 may be assembled and the space between the insulation substrates 10 and 20 may be filled with an electrolyte.

The following examples illustrate this disclosure in more detail. However, it is understood that this disclosure is not limited by these examples.

Preparation of Ink for Electrochromic Device

Example 1

Ink for an electrochromic device is prepared by uniformly mixing about 1 g of red electrochromic material represented by the following Chemical Formula 1a, about 3 g of zinc chloride ($ZnCl_2$), about 3 g of acetic acid, and about 2 g of ethylene glycol in distilled water.

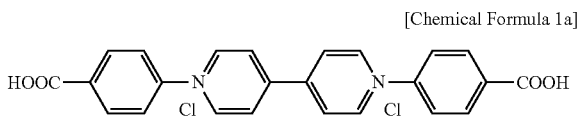

[Chemical Formula 1a]

Example 2

Ink for an electrochromic device is prepared according to the same method as Example 1, except that about 20 g of zinc chloride (ZnCl$_2$) is included.

Example 3

Ink for an electrochromic device is prepared according to the same method as Example 1, except that about 35 g of zinc chloride (ZnCl$_2$) is included.

Comparative Example 1

Ink for an electrochromic device is prepared according to the same method as Example 1, except that zinc chloride (ZnCl$_2$) is not included.

Formation of Electrochromic Layer

Electrochromic layers are formed by coating the substrates with the inks prepared according to Examples 1 to 3 and Comparative Example 1, respectively, and performing heat treatment at about 150° C. for about 30 minutes.

Confirmation of Formation of Complex Compound-1

1H NMR analysis of the electrochromic layer is performed.

Figure 3:
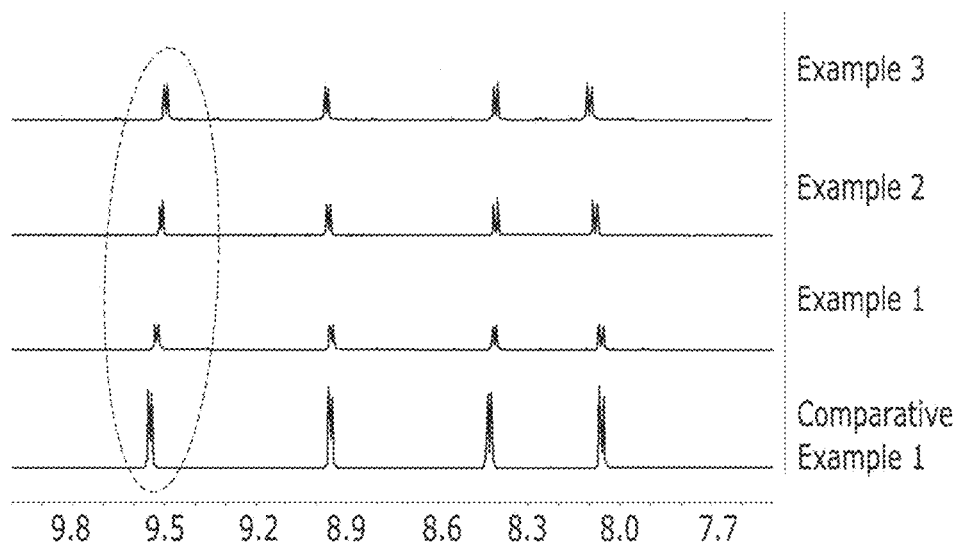
FIG. 3 is a graph showing 1H NMR results of the electrochromic layers using the ink for an electrochromic device according to Examples 1 to 3 and Comparative Example 1.

FIG. 3 is a graph showing 1H NMR results of the electrochromic layers using the ink for an electrochromic device according to Examples 1 to 3 and Comparative Example 1.

Referring to FIG. 3, when the ink prepared according to Comparative Example 1 (i.e., the ink prepared without the zinc chloride) is taken as a reference, it may be seen that the leftmost peak corresponding to a nitrogen coupling position is shifted most in the order of Example 3, Example 2, and Example 1, which is an order of larger amounts of the zinc chloride to lesser amounts of zinc chloride.

From this result, it may be seen that the zinc chloride affected the stereoscopic structure of the above Formula 1a, and that as the amount of zinc chloride is increased, the structures of more red electrochromic materials are affected. The change in the stereoscopic structure is presumed to originate from a bond of a nitrogen part of the compound represented by above Formula 1a and the zinc chloride or a bond of a terminal of the electrochromic material and the zinc chloride. When a terminal is bonded, it is likely to be a network bond, e.g. metal-organic frameworks (Metal-organic frameworks, Chem. Soc. Rev., 2003, 32, 276-288). In addition, the bond between the electrochromic material and the zinc chloride is likely to change the electron level structure unique to the electrochromic material which is closely related to the color characteristics of the electrochromic material.

Confirmation of Formation of Complex Compound-2

Heteronuclear single-quantum coherence (HSQC) analysis is performed on the electrochromic layer using the ink for an electrochromic device according to Example 2.

Figure 4:
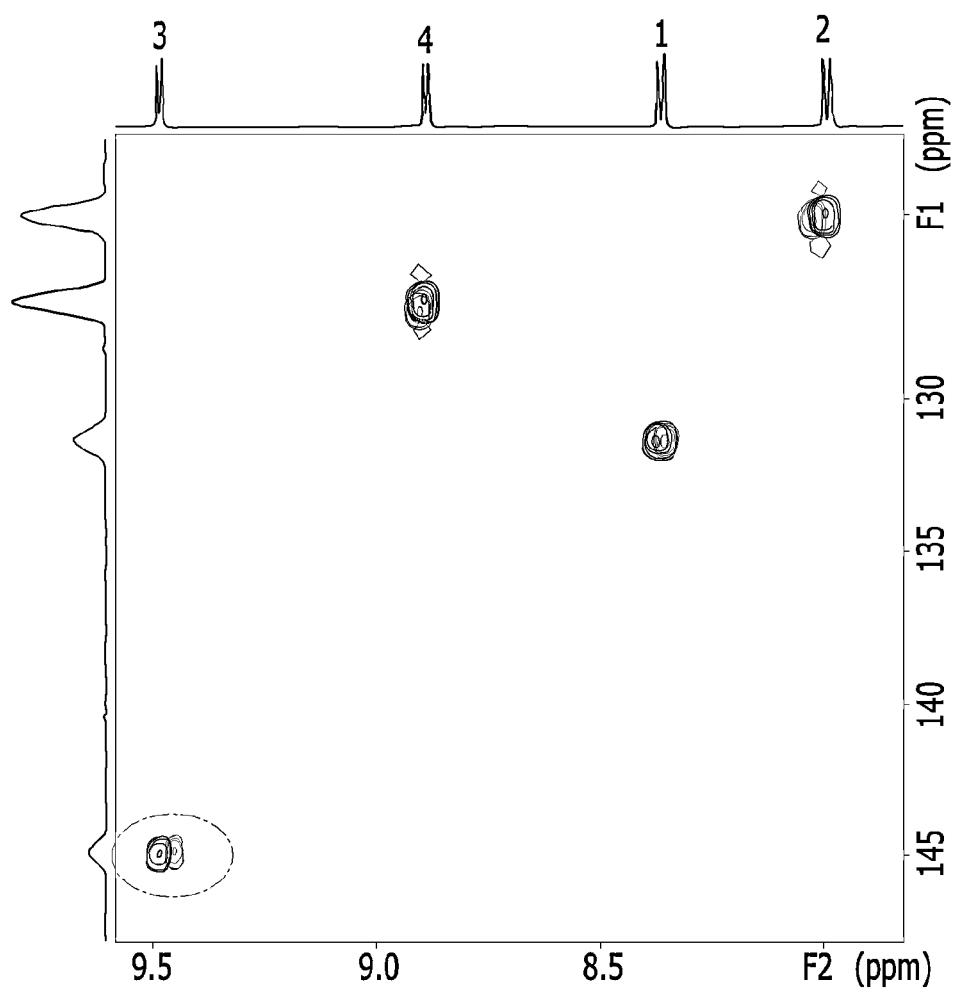
FIG. 4 is a graph showing HSQC results of the electrochromic layers using the inks for an electrochromic device according to Example 2 and Comparative Example 1.

FIG. 4 is a graph showing HSQC results of the electrochromic layers using the inks for an electrochromic device according to Example 2 and Comparative Example 1. In FIG. 4, F1 refers to "carbon", and F2 refers to "proton".

For the HSQC analysis, the symmetrical structure of the red electrochromic material represented by the above Formula 1a is given with numbers as follows.

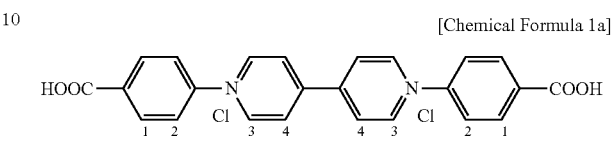

[Chemical Formula 1a]

In FIG. 4, the part marked by a thin line is a case where the ink for an electrochromic device according to Example 2 is used, and the part marked by a bold line is a case where the ink for an electrochromic device according to Comparative Example 1 is used.

Referring to FIG. 4, it may be seen that the position 3 makes a much greater shift than the positions 1, 2, and 4, and from this result, it may be presumed that there is a change in the stereoscopic structure of the position 3. The change in the stereoscopic structure may represent that the nitrogen part of the above Formula 1a is bonded with zinc chloride or a terminal of an electrochromic material is bonded with zinc chloride and the bond affects the stereoscopic structure of the nitrogen part of an electrochromic material. When a terminal is bonded, it is likely to be a network bond, e.g. metal-organic frameworks (Metal-organic frameworks, Chem. Soc. Rev., 2003, 32, 276-288). In addition, the bond between the electrochromic material and the zinc chloride is likely to change the electron level structure unique to the electrochromic material which is closely related to the color characteristics of the electrochromic material.

Fabrication of Electrochromic Device

Example 4

Indium tin oxide (ITO) is stacked on a glass substrate, and then a solution including 1 g of titanium oxide (TiO2) having an average particle diameter of about 20 nm and t-butanol at a weight ratio of about 1:6 is coated thereon by a doctor blade coating process. Subsequently, the solvent is dried and a firing process is performed at about 450° C. to form an auxiliary electrode. Ink for an electrochromic device including about 1 wt % of the red electrochromic material represented by the above Formula 1a, about 10 wt % of zinc chloride (ZnCl$_2$), about 30 wt % of acetic acid, about 20 wt % of ethylene glycol and about 39 wt % of distilled water is then prepared and sprayed onto the auxiliary electrode by using an inkjet printing system. Subsequently, a heat treatment is performed in the air at about 150° C. for about 30 minutes.

A reflective layer is formed by stacking antimony-doped tin oxide (ATO) on yet another glass substrate, and a paste (Solaronix SAT nanoxide 300) including titanium oxide (TiO2) having an average particle diameter of about 300 nm is coated thereon. Herein, the mesh size of the used sieve is about 86 μm. Subsequently, a heating process is performed at about 70° C. for about 20 minutes to evaporate the solvent, and then a firing process is performed about 450° C. for about 1 hour in air to form an upper electrode.

An electrochromic device is then prepared by assembling the two glass substrates, forming fine pores on the surface of the upper electrode, and filling the space between the two glass substrates with γ-butyrolactone including 0.05M of $LiClO_4$ and 0.05 M of ferrocene as an electrolyte.

Example 5

An electrochromic device is fabricated according to the same method as Example 4, except that an auxiliary electrode is formed by performing a firing process at about 350° C.

Example 6

An electrochromic device is fabricated according to the same method as Example 4, except that an aramid film (polymer substrate) is used instead of a glass substrate and an auxiliary electrode is formed by performing a firing process at about 350° C.

Comparative Example 2

An electrochromic device is fabricated according to the same method as Example 4, except that ink for an electrochromic device includes about 1 wt % of red electrochromic material represented by the above formula 1a, about 30 wt % of acetic acid, about 20 wt % of ethylene glycol, and about 49 wt % of distilled water.

Evaluation of Color Characteristics-1

Color characteristics of the electrochromic devices according to Example 4 and Comparative Example 2 are estimated based on the color coordinates.

Figure 5A:
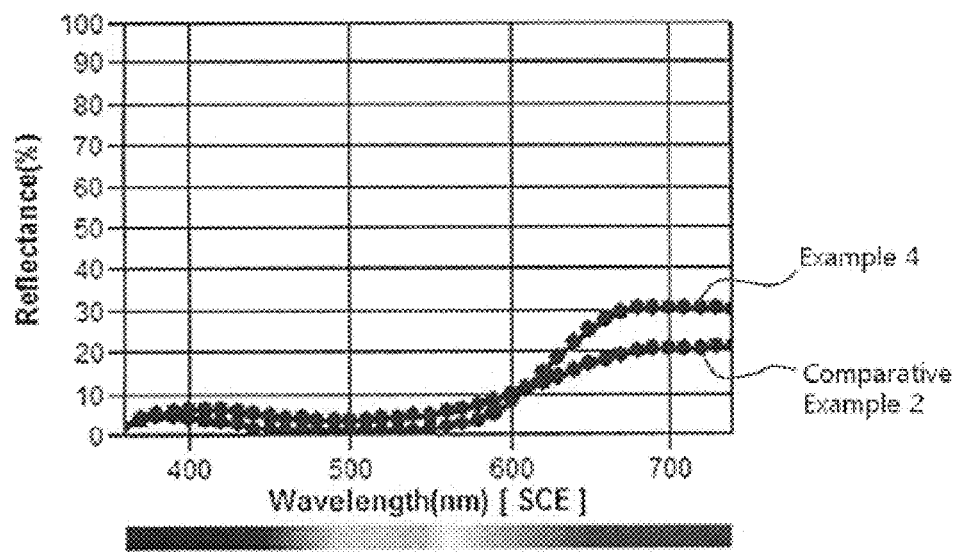
FIG. 5A is a graph showing wavelength-based reflectivity of the electrochromic devices according to Example 4 and Comparative Example 2.
Figure 5B:
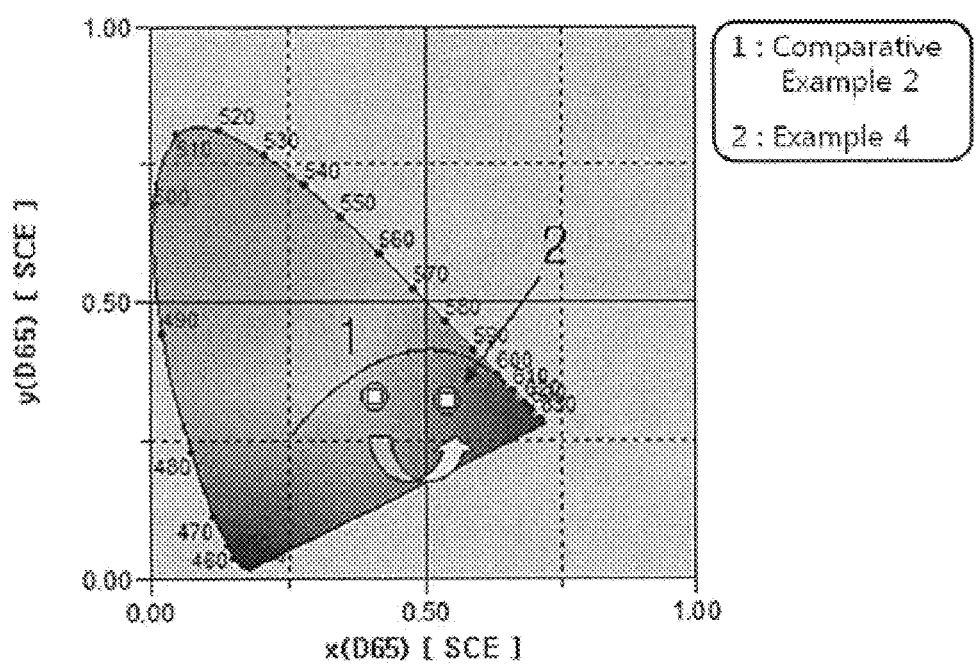
FIG. 5B shows color coordinates of the electrochromic devices according to Example 4 and Comparative Example 2.

FIG. 5A is a graph showing wavelength-based reflectivity of the electrochromic devices according to Example 4 and Comparative Example 2, and FIG. 5B shows color coordinates of the electrochromic devices according to Example 4 and Comparative Example 2.

Referring to FIGS. 5A and 5B, it may be seen that the electrochromic device according to Example 4 shows higher reflectivity and improved red color coordinates in the red wavelength region ranging from about 650 nm to about 750 nm, compared with the electrochromic device according to Comparative Example 2.

Evaluation of Color Characteristics-2

Figure 6A:
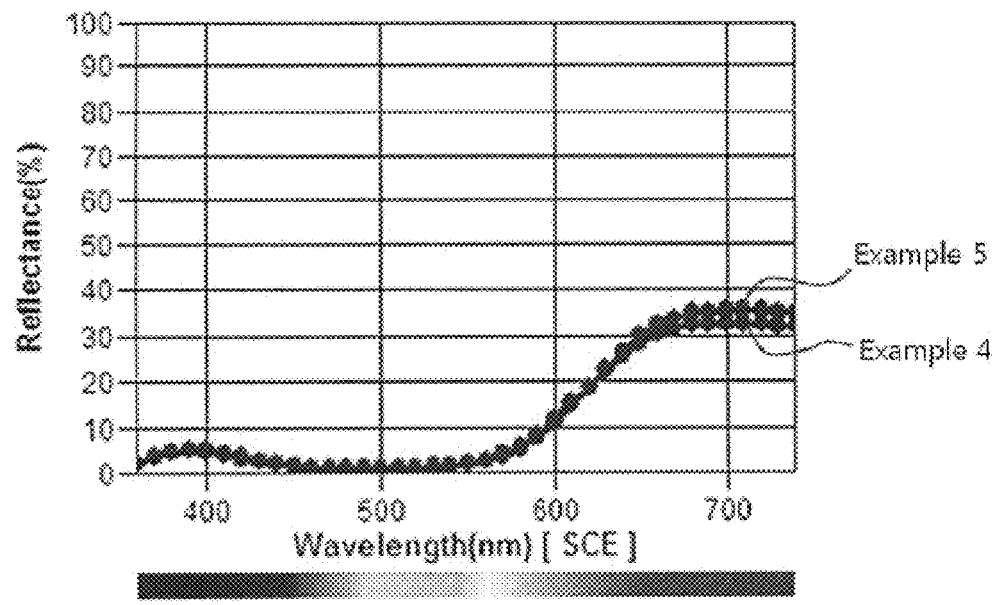
FIG. 6A is a graph showing wavelength-based reflectivity of the electrochromic devices according to Examples 4 and 5.
Figure 6B:
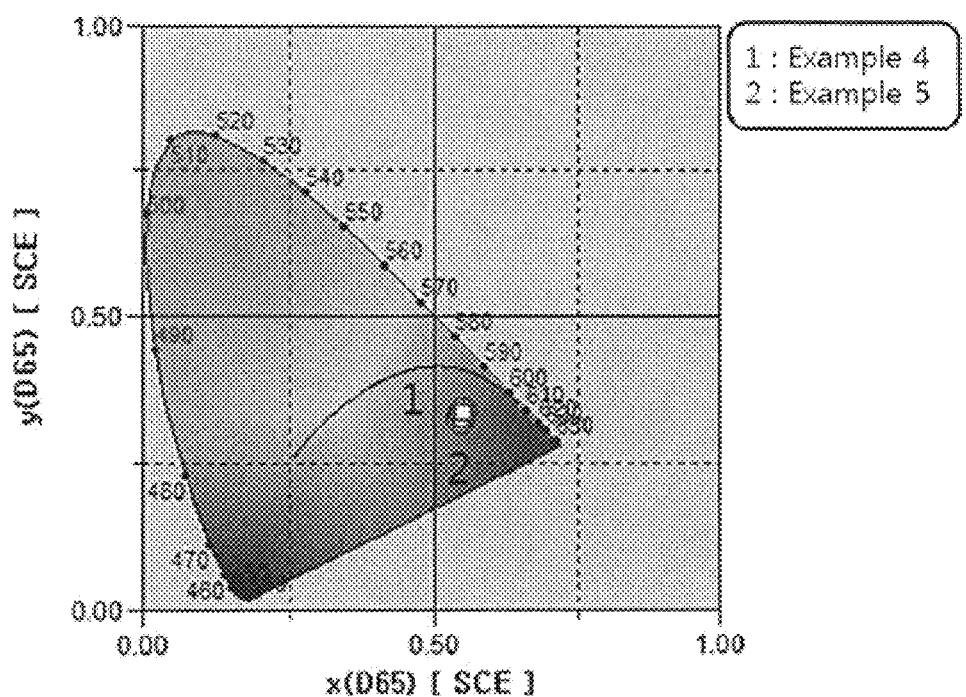
FIG. 6B shows color coordinates of the electrochromic devices according to Examples 4 and 5.

FIG. 6A is a graph showing wavelength-based reflectivity of the electrochromic devices according to Examples 4 and 5, and FIG. 6B shows color coordinates of the electrochromic devices according to Examples 4 and 5.

In FIGS. 6A and 6B, it may be seen that the electrochromic device according to Example 4 of which firing temperature of the auxiliary electrode is about 450° C. and the electrochromic device of which firing temperature of the auxiliary electrode is about 350° C. represent almost the same red color.

It may be seen from the results that the color characteristics are not degraded even though an auxiliary electrode is fired at a relatively low temperature.

Evaluation of Color Characteristics-3

Figure 7A:
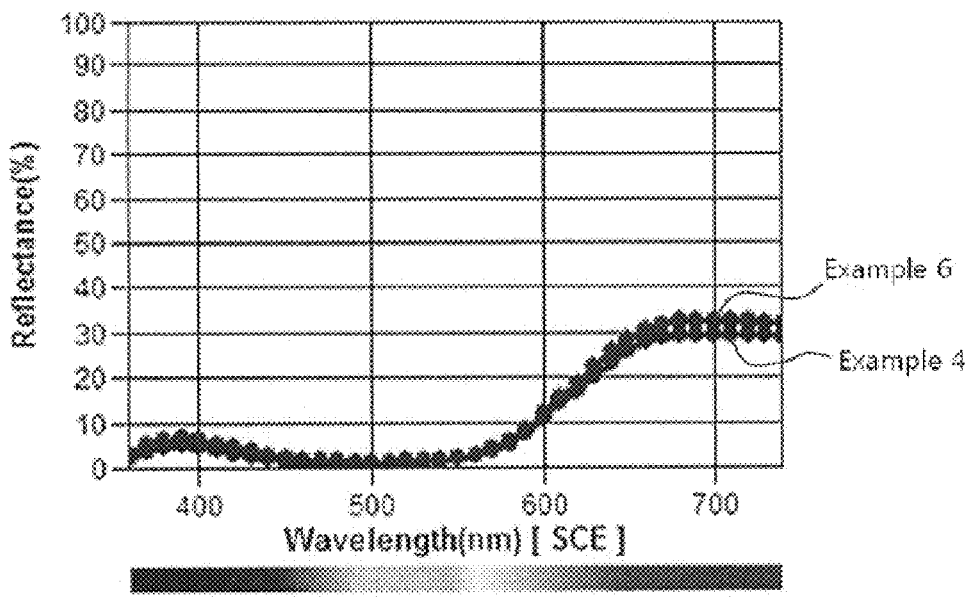
FIG. 7A is a graph showing wavelength-based reflectivity of the electrochromic devices according to Examples 4 and 6.
Figure 7B:
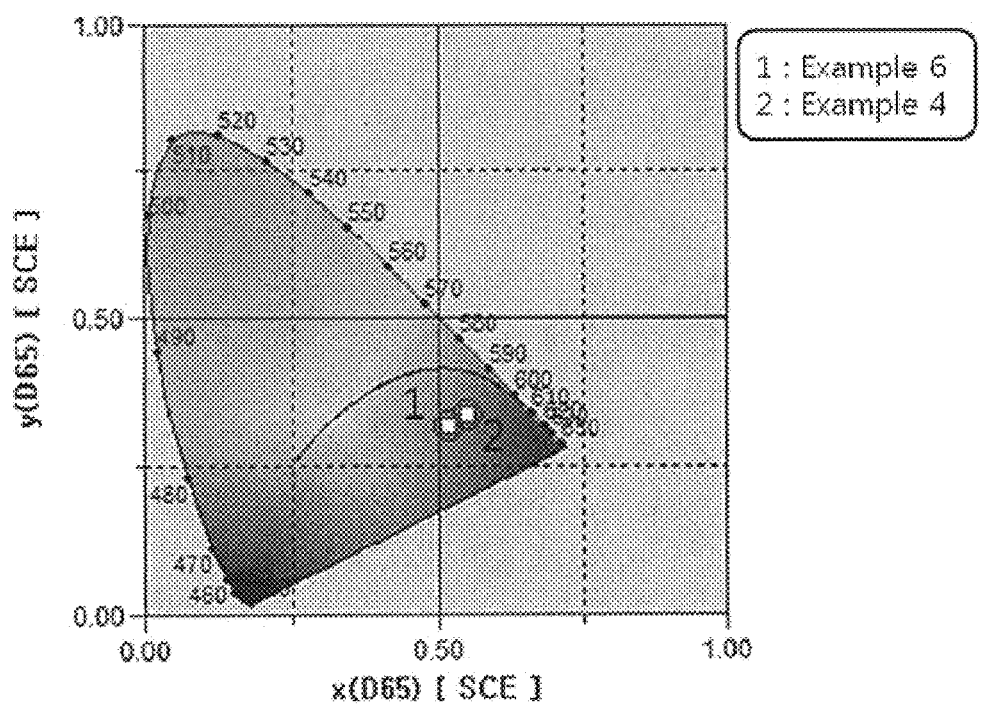
FIG. 7B shows color coordinates of the electrochromic devices according to Examples 4 and 6.

FIG. 7A is a graph showing wavelength-based reflectivity of the electrochromic devices according to Examples 4 and 6, and FIG. 7B shows color coordinates of the electrochromic devices according to Examples 4 and 6.

Referring to FIGS. 7A and 7B, the electrochromic device according to Example 6 which uses a polymer substrate and an auxiliary electrode fired at about 350° C. represents a red color similar to that of the electrochromic device fabricated according to Example 4.

It may be seen from the results that the color characteristics are not degraded even though a polymer substrate is used and a firing process is performed at a relatively low temperature.

While this disclosure has been described in connection with what is presently considered to be practical example embodiments, it is to be understood that the invention is not limited to example embodiments, but, on the contrary, is intended to cover various modifications and equivalent arrangements included within the spirit and scope of the appended claims.

What is claimed is:

1. Ink for an electrochromic device, comprising:
   an electrochromic material;
   a metal salt; and
   a solvent,
   wherein the metal salt is included in an amount of about 300 to about 2000 parts by weight based on 100 parts by weight of the electrochromic material,
   wherein the metal includes at least one of zinc (Zn), indium (In), zirconium (Zr), strontium (Sr), tin (Sn), hafnium (Hf), tantalum (Ta), cerium (Ce), lanthanum (La), vanadium (V), niobium (Ni), yttrium (Y), and a combination thereof.

2. The ink for an electrochromic device of claim 1, wherein the metal salt includes a metal that forms a complex compound with the electrochromic material through heat treatment.

3. The ink for an electrochromic device of claim 2, wherein the ink displays a color of a different color coordinate from an intrinsic color of the electrochromic material.

4. The ink for an electrochromic device of claim 1, wherein the electrochromic material is included in an amount of about 0.01 wt % to about 30 wt % based on the total weight of the ink.

5. The ink for an electrochromic device of claim 1, further comprising:
   at least one of a dissolution aid agent and a viscosity controlling agent.

6. An electrochromic device comprising:
   a first electrode and a second electrode facing each other;
   an auxiliary electrode on one of the first electrode and the second electrode;
   an electrochromic layer on the auxiliary electrode; and
   an electrolyte between the first electrode and second electrode,
   wherein the electrochromic layer includes ink having an electrochromic material and a metal salt, the metal salt being included in the ink in an amount of about 300 to about 2000 parts by weight based on 100 parts by weight of the electrochromic material,
   wherein the metal includes at least one of zinc (Zn), indium (In), zirconium (Zr), strontium (Sr), tin (Sn), hafnium (Hf), tantalum (Ta), cerium (Ce), lanthanum (La), vanadium (V), niobium (Ni), yttrium (Y), and a combination thereof.

7. The electrochromic device of claim 6, wherein the electrochromic layer includes a complex compound of a metal of the metal salt and the electrochromic material.

8. The electrochromic device of claim 6, wherein color coordinates of a color represented by the electrochromic layer is different from an intrinsic color represented by the electrochromic material.

9. A method for manufacturing an electrochromic device, the method comprising:

preparing a first electrode;
forming an auxiliary electrode on the first electrode;
forming an electrochromic layer on the auxiliary electrode by using ink including an electrochromic material, a metal salt, and a solvent, the metal salt being included in the ink in an amount of about 300 to about 2000 parts by weight based on 100 parts by weight of the electrochromic material;
arranging a second electrode on the first electrode; and
filling spaces between the first electrode and the second electrode with an electrolyte,
wherein the metal includes at least one of zinc (Zn), indium (In), zirconium (Zr), strontium (Sr), tin (Sn), hafnium (Hf), tantalum (Ta), cerium (Ce), lanthanum (La), vanadium (V), niobium (Ni), yttrium (Y), and a combination thereof.

10. The method of claim 9, wherein the forming the electrochromic layer comprises:
spraying the ink onto the auxiliary electrode; and
heat-treating the ink.

11. The method of claim 10, wherein heat-treating the ink is performed at a temperature of about 60 to 300° C.

12. The method of claim 11, wherein the metal salt includes a metal that forms a complex compound with the electrochromic material through the heat treatment.

13. The method of claim 9, further comprising:
firing the auxiliary electrode at a temperature of about 300 to 500° C.

14. The method of claim 9, wherein the electrochromic material in the ink is included in an amount of about 0.01 wt % to about 30 wt % based on the total weight of the ink.

15. The method of claim 9, wherein the ink further includes at least one of a dissolution aid agent and a viscosity controlling agent.

* * * * *